United States Patent Office 3,085,688
Patented Apr. 16, 1963

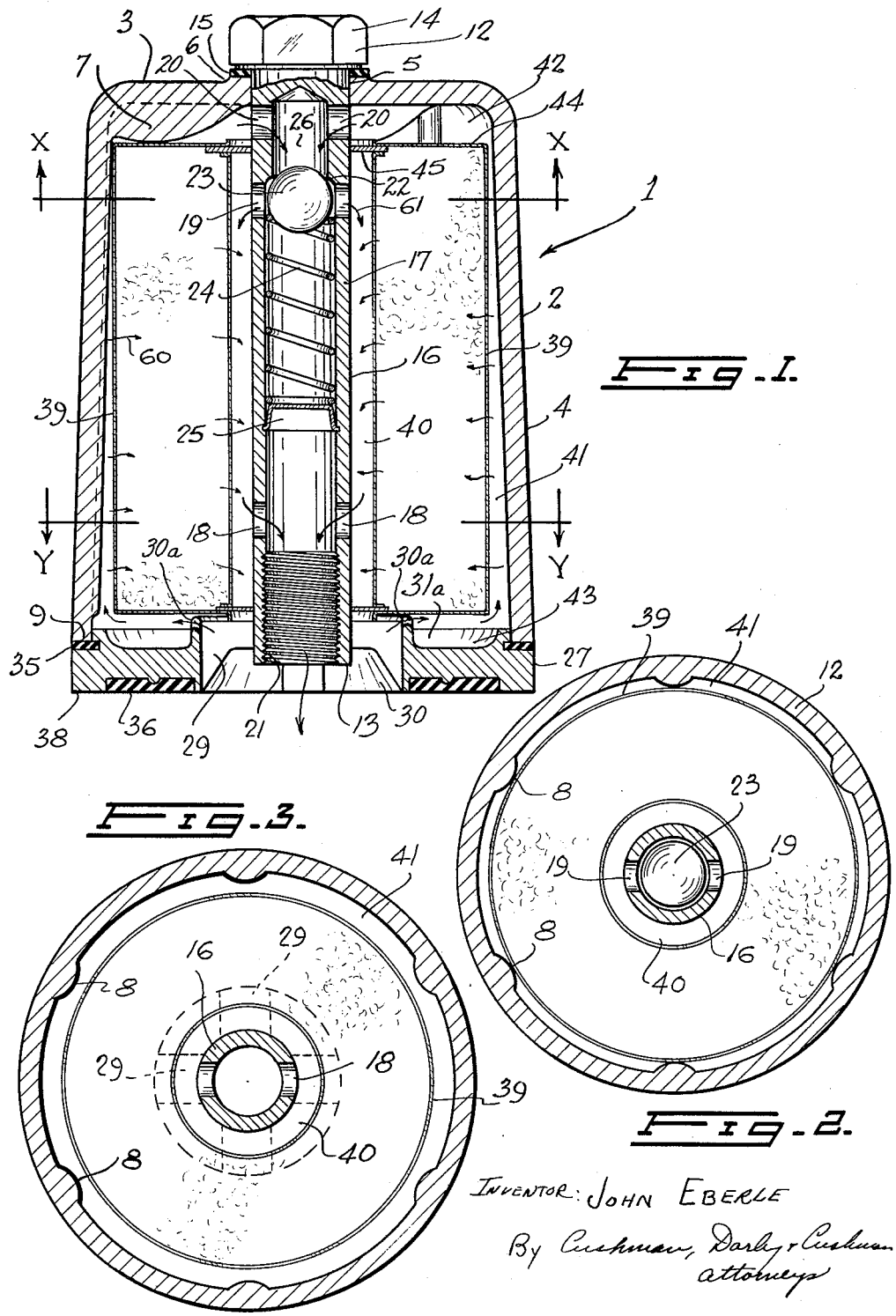

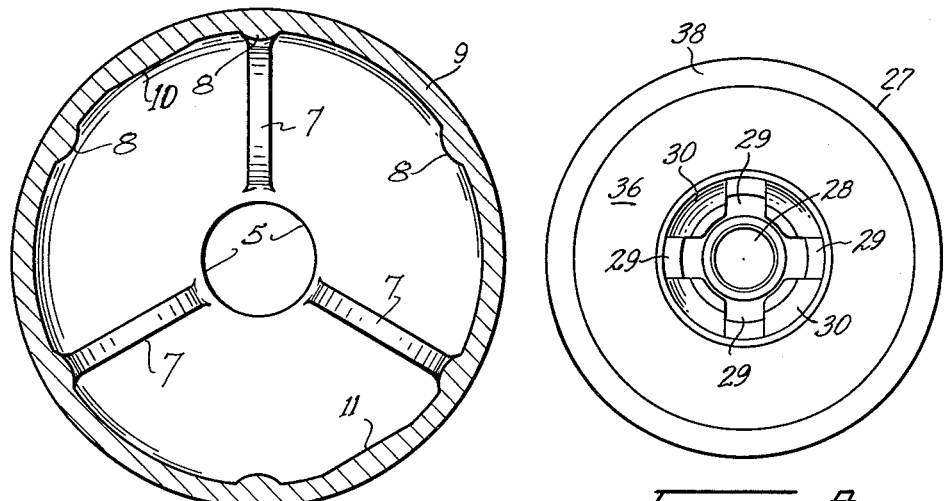
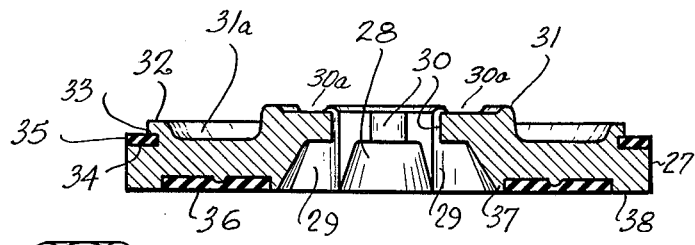
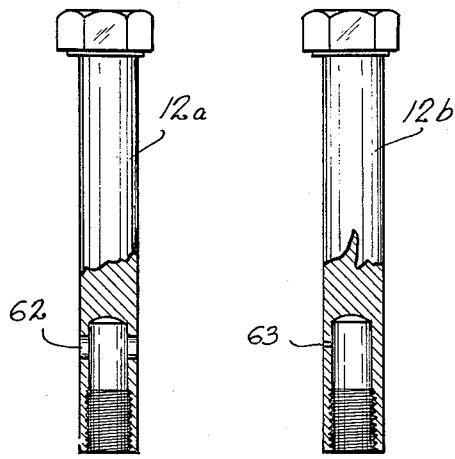

3,085,688
OIL-FILTERS FOR INTERNAL COMBUSTION ENGINES
John Eberle, 1708 27th Ave. SW., Calgary, Alberta, Canada
Filed Jan. 6, 1960, Ser. No. 766
Claims priority, application Canada Dec. 31, 1959
4 Claims. (Cl. 210—232)

The present invention relates to oil-filters for internal combustion engines.

The general objects of the invention are to provide a filter for an automobile motor which will be quicker and simpler to install than the majority of the filters presently in use, and to reduce the cost of replacing filters.

The main object of the invention is to provide a replacement for the presently existing spin-on filters that must be completely discarded whenever the filtering element becomes clogged or dirty.

The most popular filter at the moment is a sealed unit which is discarded about every 4,000 miles. The units are expensive and are very difficult to remove and install due to the lack of space in the area in which they must be installed.

In the case of the present invention however the new spin-on filter housing may be opened so that the inner filtering element only need be replaced. The new spin-on filter housing fits the motor block in the same manner as existing spin-on filters and does not require any additional adaptor plates.

An additional object of the invention is to provide a filtering element having a very simple yet very effective filtering cycle.

Further objects will be apparent from the following description based on the accompanying drawings in which:

FIGURE 1 represents a vertical sectional view of a filter according to the invention;

FIGURE 2 is a sectional plan view along line X—X in FIGURE 1 and

FIGURE 3 is a sectional plan view along line Y—Y in FIGURE 1.

FIGURE 4 is a view from below of the filter housing without the filter cartridge and bolt;

FIGURE 5 is a vertical sectional view through the adaptor plate.

FIGURES 6 and 7 are modified bolt members.

FIGURE 8 shows the device of FIGURE 1 in plan viewed from below.

The filter indicated generally at 1 comprises a cylindrical housing 2 having top 3 and sidewalls 4, the sidewalls being tapered outwardly slightly from top to bottom as shown in FIGURE 1. The top 3 has a centrally located aperture 5 (FIGURE 4) and concentric therewith an external boss 6. Inwardly of the housing shoulder members 7 formed integral with the top 3 extend radially outwardly from the aperture 5 to the sidewalls, and rib members 8 extend downwardly along the sidewalls from the top 3 to the bottom edge 9 of the housing. Adjacent the lower edge 9 the inner surface of the casing wall is thickened slightly at 10 and 11 to form friction surfaces. (See FIGURES 4 and 5.)

A hollow bolt member 12 extends downwardly through aperture 5 centrally of the housing 2 to a position at which the end 13 of the bolt is slightly below the lower edge 9 of the housing. The bolt has a head 14 that bears against a washer 15 resting on boss 6. The stem 16 of the bolt comprises sidewalls 17 having apertures 18, 19, and 20. The lower end 13 of the bolt is threaded internally at 21.

Adjacent the head end of the bolt the sidewalls 17 of the bolt are thickened slightly forming an internal shoulder 22. A spherical valve member 23 is urged against that shoulder by spring 24 resting on seat 25 frictionally mounted within bolt 12. The valve member 23 and the thickened sidewalls of the bolt define a chamber 26 at the head end of the bolt that is accessible through apertures 20.

An adaptor plate 27 has a centrally disposed aperture 28 adapted to receive the threaded end of bolt 12, and openings or ducts 29 radiating outwardly from said aperture as shown full in FIGURE 8 and in dotted lines in FIGURE 3, both the aperture and the openings being defined by lugs or septa 30 (having radial slots 30a at their open end) and an inner collar or boss member 31, both the lugs and the collar formed integral with plate 27, the lugs or septa being approximately triangular in shape with flattened apexes defining the aperture 28. The openings or ducts 29 are further defined by the lower end of stem 16 of bolt 12, when the bolt is in place. As best shown in FIGURES 1 and 5 the lugs 30 define a generally frustro-conical opening at the underside of the adapter plate to facilitate oil flow into the cartridge.

A ridge or intermediate collar member 32 is spaced from and concentric with the outer periphery of the adaptor and therewith defines shoulder 33 and gasket seat 34 carrying upper gasket 35 on the upper side of the adaptor. A channel or dished portion 31a is defined between boss member 31 and ridge member 32. The lugs or septa 30 terminate at the aperture 28 and serve as cartridge-support members.

On the under side of the adaptor lower gasket 36 is removably mounted in a gasket seat defined between shoulder or collar 37 formed by the protrusion of collar or boss 31, and a shoulder or peripheral collar 38 concentric with and contiguous to the periphery of the adaptor. And it will be noted that the inner boss or collar member 31 is higher than ridge or collar member 32.

It will be noted that aperture 28 and ducts 29 together form a cross-shaped or cruciform aperture that is enclosed by collar 37.

A conventional filter cartridge 39 is inserted into the housing 2 over stem 16 of bolt 12 and is held in place by means of cartridge-support lugs or septa members 30 on adaptor plate 27, the gasket 35 of which forms an oil-tight seal with the bottom edge 9 of the housing 2, portions of shoulder 33 being enlarged slightly in order to engage frictionally with surfaces 10 and 11.

The threaded portion 21 of bolt 12 is adapted to engage a threaded stud (not shown) of a motor block.

The cartridge 39 serves to define passage 40 between itself and the bolt, passages 41 and 42 between itself and the housing, and passage 43 with the adaptor plate. Passages 41, 42 and 43 are intercommunicating and communicate with openings or ducts 29 that radiate from aperture 28 (see FIGURE 8) in the adaptor plate, and which are defined by the lugs or septa 30 and the end of the bolt 12. Passage 43 is formed partly by channel 31a.

The filter cartridge 39 has metal ends 44 covering the fiber or paper discs 45 that form a substantially oil-tight seal with the stem 16 of bolt 12.

Oil from the engine is pumped into openings, ports, or ducts 29, into passage 43 and flows freely into and in passages 41 and 42 thereby surrounding the outer wall of filter cartridge 39 with a bath of oil to be filtered, the oil flowing freely from one side of the cartridge to the other through aperture 20. The oil flows from the engine under pressure and therefore passes through the filter cartridge from the outside to the center, into passage 40, through apertures 18 and back through the bolt to the engine. The oil cycle is indicated by arrows 60 in FIGURE 1.

Should the filter become so clogged with dirt that oil can no longer pass through it the oil pressure will then cause valve 23 to be depressed thus permitting oil to bypass the filter element by flowing through apertures 19 into passage 40 and then via apertures 18 to the bolt and back to the engine. See arrows 61 in FIGURE 1.

The securing of the bolt 12 to a threaded stud on the engine block results in an oil-tight seal being formed between the block and gasket 36 thus providing all the advantages of filter cartridge assemblies that are fitted into the engine block. In the mounting of prior art assemblies it is frequently found that the outer shell is not in place when the assembly is secured to the block with the result that the unit is canted slightly on the block forming an imperfect seal with consequent loss of oil and damage to parts.

The present filter unit may quickly and easily be removed, recharged and reassembled, it being necessary merely to tighten bolt 12 in order to establish a perfect oil-tight seal between the adaptor plate of the unit and the engine block. The adaptor plate is novel in structure and design and renders the present structure patentably distinct from the structures of the prior art.

The bolt member 12 described above is designed to be used on engines manufactured by the Ford Motor Company and the Chrysler Corporation.

Alternatively if the motor is of Buick or Oldsmobile design the bolt 12A shown in FIGURE 6 would be used. That bolt is designed for a full flow system and does not require a by-pass valve, the by-pass being built into the motor block. It has apertures 62 only and the only oil that flows through them is oil that has passed through the filter cartridge.

If the filter element is to be used on engines of Nash, Studebaker, Volkswagon or Renault design or on any engine not presently equipped with filter, the bolt 12B shown in FIGURE 7 is employed.

Bolt 12B is designed for use in a by-pass system. The basic concept of such a system is that the flow of oil through the filter element is metered, the metering being accomplished by the very small hole 63 in the bolt which restricts the amount of oil which may enter the filter by restricting the amount which may pass through the filter and back into the oil-pan. This oil then mixes with the remainder of the oil and eventually all the oil passes through the filter.

Obviously therefore the bolts may be interchanged and as the adaptor plate is designed to fit all motors it will be realized that the present invention has a very wide application.

The embodiments of the invention in which an exclusive property or privilege is claimed are defined as follows:

1. In combination with a removable oil filtering device, an open-ended rechargeable filter cartridge housing; a threaded and apertured bolt operative to be secured to an engine block; a unitary adapter plate having an upper side and a lower side operative to be positioned between the engine block and said cartridge housing, said adapter plate including an outer concentric collar along said upper side and spaced from the periphery thereof and defining thereby an upper gasket seat, an upper gasket mounted within the upper gasket seat for engagement with the open end of said cartridge housing to seal the same, said lower side having an annular concentric recessed gasket seat, a gasket mounted within said recessed gasket seat for engagement with the engine block, said plate having a central aperture for receiving said bolt, an inner collar concentric with said aperture and protruding slightly from both sides of said plate wherein said bottom gasket is positioned radially outwardly of the lower protruding portion of said inner collar; a plurality of radially spaced apart lugs extending between said inner collar and said adapter plate aperture to define oil passages between adjacent lugs, and an annular dished portion formed in the upper side of said adaptor plate between said inner and outer collars, whereby the removable oil filtering device can be supported on the upper end of said inner collar and oil can flow into said cartridge housing via the space between said radial lugs and into said dished portion.

2. The combination defined in claim 1 wherein said lugs are generally triangular in plan, their inner extremities defining said central aperture, whereby said bolt defines a portion of the oil passages with said lugs.

3. The combination defined in claim 1 wherein said lugs define a frusto-conical central opening configuration at the lower side of said plate to define an oil passage concentric with said bolt.

4. The combination defined in claim 1 wherein said bolt is interiorly threaded at its lower end.

References Cited in the file of this patent
UNITED STATES PATENTS

| | | |
|---|---|---|
| 2,212,647 | Nugent | Aug. 27, 1940 |
| 2,493,452 | Grigg | Jan. 3, 1950 |
| 2,743,018 | Belgarde | Apr. 24, 1956 |
| 2,749,149 | Carpenter | June 5, 1956 |
| 2,884,133 | Walulik et al. | Apr. 28, 1959 |

FOREIGN PATENTS

| | | |
|---|---|---|
| 582,546 | Canada | Sept. 1, 1959 |